US011636173B2

(12) United States Patent
Ham et al.

(10) Patent No.: US 11,636,173 B2
(45) Date of Patent: Apr. 25, 2023

(54) METHOD FOR CANDIDATE SELECTION AND ACCELERATOR FOR PERFORMING CANDIDATE SELECTION

(71) Applicants: SK hynix Inc., Icheon-si (KR); Seoul National University R&DB Foundation, Seoul (KR)

(72) Inventors: Tae Jun Ham, Seoul (KR); Seonghak Kim, Seoul (KR); Sungjun Jung, Seoul (KR); Younghwan Oh, Seoul (KR); Jaewook Lee, Seoul (KR); Deog-Kyoon Jeong, Seoul (KR); Minsoo Lim, Hwaseong-si (KR)

(73) Assignees: SK hynix Inc., Icheon-si (KR); Seoul National University R&DB Foundation, Seoul (KR)

( * ) Notice: Subject to any disclaimer, the term of this patent is extended or adjusted under 35 U.S.C. 154(b) by 398 days.

(21) Appl. No.: 16/831,481

(22) Filed: Mar. 26, 2020

(65) Prior Publication Data

US 2020/0311182 A1 Oct. 1, 2020

(30) Foreign Application Priority Data

Mar. 28, 2019 (KR) ........................ 10-2019-0035790
Feb. 20, 2020 (KR) ........................ 10-2020-0020750

(51) Int. Cl.

*G06F 17/16* (2006.01)
*G06F 18/22* (2023.01)
*G06F 18/21* (2023.01)
*G06N 3/044* (2023.01)

(52) U.S. Cl.

CPC ............ *G06F 17/16* (2013.01); *G06F 18/217* (2023.01); *G06F 18/22* (2023.01); *G06N 3/044* (2023.01)

(58) Field of Classification Search

CPC .... G06F 17/16; G06K 9/6215; G06K 9/6262; G06N 3/0445; G06N 3/0481; G06N 3/063

See application file for complete search history.

(56) References Cited

U.S. PATENT DOCUMENTS 6,236,684 B1 * 5/2001 Wu ...................... H04N 19/593 375/240.18
6,601,052 B1 7/2003 Lee et al.
6,882,970 B1 * 4/2005 Garner .................. G06F 16/632 707/E17.103

(Continued)

FOREIGN PATENT DOCUMENTS

KR 100746036 B1 8/2007
KR 1020070111470 A 11/2007

(Continued)

OTHER PUBLICATIONS

A. Auvolat and P. Vincent, "Clustering is efficient for approximate maximum inner product search," CoRR, 2015, pp. 1-10.

(Continued)

*Primary Examiner* — Aaron W Carter

(74) *Attorney, Agent, or Firm* — William Park & Associates Ltd.

(57) ABSTRACT

An accelerator includes a key matrix register configured to store a key matrix, a query vector register configured to store a query vector; and a preprocessor configured to calculate similarities between the query vector and the key matrix.

20 Claims, 14 Drawing Sheets

100
Maximum Pointer
Minimum Pointer
Query Vector
Score Estimator
>0
Candidate Row
Preprocessing Controller
110 111 120 121 130 131 140 141 150 151 160 161 170 180 190

(56) References Cited

U.S. PATENT DOCUMENTS

| | | | | |
|---|---|---|---|---|
| 9,159,584 | B2 * | 10/2015 | Lapir | H01L 23/3128 |
| 2004/0054666 | A1 * | 3/2004 | Lapir | G06F 16/90339 |
| 2008/0025596 | A1 * | 1/2008 | Podilchuk | G06K 9/6215 382/155 |
| 2008/0250016 | A1 * | 10/2008 | Farrar | G16B 30/00 |
| 2012/0239706 | A1 * | 9/2012 | Steinfadt | G16B 30/00 707/E17.044 |
| 2013/0013291 | A1 * | 1/2013 | Bullock | G06F 40/30 704/9 |
| 2016/0259826 | A1 * | 9/2016 | Acar | G06F 16/9535 |
| 2016/0299975 | A1 * | 10/2016 | Acar | G06F 16/24569 |
| 2017/0236000 | A1 | 8/2017 | Hwang et al. | |
| 2018/0341642 | A1 * | 11/2018 | Akerib | G06N 3/0454 |
| 2019/0065443 | A1 * | 2/2019 | Baba | G06F 40/151 |
| 2020/0311182 | A1 * | 10/2020 | Ham | G06K 9/6215 |
| 2020/0348211 | A1 * | 11/2020 | Sundermeyer | G01M 17/007 |
| 2022/0083500 | A1 * | 3/2022 | Tsai | G06F 7/523 |

FOREIGN PATENT DOCUMENTS

| | | |
|---|---|---|
| KR | 1020090044927 A | 5/2009 |
| KR | 1020100102283 A | 9/2010 |

OTHER PUBLICATIONS

A. Graves, G. Wayne, and I. Danihelka, "Neural Turing Machines," CoRR, 2014, Google DeepMind, London, UK.

A. M. Rush, S. Chopra, and J. Weston, "A Neural Attention Model for Abstractive Sentence Summarization," in Proceedings of Conference on Empirical Methods in Natural Language Processing, EMNLP, 2015.

A. Miller, A. Fisch, J. Dodge, A.-H. Karimi, A. Bordes, and J. Weston, "Key-Value Memory Networks for Directly Reading Documents," in Empirical Methods in Natural Language Processing, EMNLP, 2016.

A. P. Parikh et al., "A Decomposable Attention Model for Natural Language Inference," in Empirical Methods in Natural Language Processing, EMNLP, Nov. 2016, Austin, Texas.

A. Parashar, M. Rhu, A. Mukkara, A. Puglielli, R. Venkatesan, B. Khailany, J. Emer, S. W. Keckler, and W. J. Dally, "SCNN: An Accelerator for Compressed-sparse Convolutional Neural Networks," in Proceedings of the 44th Annual International Symposium on Computer Architecture, ISCA, Jun. 24-28, 2017, pp. 27-40, ACM/IEEEToronto, ON, Canada.

A. Shrivastava and P. Li, "Asymmetric LSH (ALSH) for Sublinear Time Maximum Inner Product Search (MIPS)," in Proceedings of the 27th International Conference on Neural Information Processing Systems, NIPS, 2014, pp. 1-9.

A. Vaswani, N. Shazeer, N. Parmar, J. Uszkoreit, L. Jones, A. N. Gomez, Ł. Kaiser, and I. Polosukhin, "Attention Is All You Need," in 31st Conference on Neural Information Processing Systems, NIPS, 2017, pp. 1-11, Long Beach, CA, USA.

Alex Graves et al., "Hybrid computing using a neural network with dynamic external memory," Nature, Oct. 27, 2016, vol. 538, pp. 471-476, Macmillan Publishers Limited, part of Springer Nature.

B. Wang, K. Liu, and J. Zhao, "Inner Attention based Recurrent Neural Networks for Answer Selection," in Proceedings of the 54th Annual Meeting of the Association for Computational Linguistics, Aug. 7-12, 2016, pp. 1288-1297, Berlin, Germany.

C. Gao, D. Neil, E. Ceolini, S.-C. Liu, and T. Delbruck, "DeltaRNN: A Power-efficient Recurrent Neural Network Accelerator," Special Session: Deep Learning, in Proceedings of the 2018 ACM/SIGDA International Symposium on Field-Programmable Gate Arrays, FPGA, February 25-27, pp. 21-30, Monterey, CA, USA.

C. Zhang, P. Li, G. Sun, Y. Guan, B. Xiao, and J. Cong, "Optimizing FPGA-based Accelerator Design for Deep Convolutional Neural Networks," in Proceedings of the 2015 ACM/SIGDA International Symposium on Field-Programmable Gate Arrays, FPGA, Feb. 22-24, 2015, pp. 161-170, Monterey, California, USA.

Chunseong Park, Cesc, Byeongchang Kim, and Gunhee Kim, "Attend to You: Personalized Image Captioning with Context Sequence Memory Networks," in Proceedings of the IEEE Conference on Computer Vision and Pattern Recognition, ICCV, 2017, pp. 895-903.

D. Bahdanau, K. Cho, and Y. Bengio, "Neural Machine Translation By Jointly Learning To Align and Translate," ICLR, 2015, pp. 1-15.

D. Liu, T. Chen, S. Liu, J. Zhou, S. Zhou, O. Teman, X. Feng, X. Zhou, and Y. Chen, "PuDianNao: A Polyvalent Machine Learning Accelerator," in Proceedings of the 20th International Conference on Architectural Support for Programming Languages and Operating Systems, ASPLOS, Mar. 14-18, 2015, pp. 369-381, Istanbul, Turkey.

Dehghani, Mostafa, et al. "Universal Transformers," CoRR, 2018, pp. 1-23.

E. Grave, T. Mikolov, A. Joulin, and P. Bojanowski, "Bag of Tricks for Efficient Text Classification," in Proceedings of the Conference of the European Chapter of the Association for Computational Linguistics, EACL, 2017.

Ebesu, Travis, Bin Shen, and Yi Fang, "Collaborative Memory Network for Recommendation Systems," The 41st International ACM SIGIR Conference on Research & Development in Information Retrieval, ACM, Jul. 8-12, 2018, Ann Arbor, MI, USA.

F. Wang, M. Jiang, C. Qian, S. Yang, C. Li, H. Zhang, X. Wang, and X. Tang, "Residual Attention Network for Image Classification," in Conference on Computer Vision and Pattern Recognition, CVPR, 2017, pp. 3156-3164.

H. Yu, C. Hsieh, Q. Lei, and I. S. Dhillon, "A Greedy Approach for Budgeted Maximum Inner Product Search," in Proceedings of the 31st Conference on Neural Information Processing Systems, NIPS, 2017, Long Beach, CA, USA.

J. Albericio, P. Judd, T. Hetherington, T. Aamodt, N. E. Jerger, and A. Moshovos, "Cnvlutin: Ineffectual-Neuron-Free Deep Neural Network Computing," in Proceedings of the 43rd International Symposium on Computer Architecture, SCA, 2016, pp. 1-13, ACM/IEEE.

J. Devlin, M.-W. Chang, K. Lee, and K. Toutanova, "BERT: Pre-training of Deep Bidirectional Transformers for Language Understanding," CoRR, 2018.

J. Fowers, K. Ovtcharov, M. Papamichael, T. Massengill, M. Liu, D. Lo, S. Alkalay, M. Haselman, L. Adams, M. Ghandi, S. Heil, P. Patel, A. Sapek, G. Weisz, L. Woods, S. Lanka, S. K. Reinhardt, A. M. Caulfield, E. S. Chung, and D. Burger, "A Configurable Cloud-Scale DNN Processor for Real-Time AI," in Proceedings of the 45th Annual International Symposium on Computer Architecture, ISCA, 2018, pp. 1-14, IEEE Computer Society.

J. Kuen, Z. Wang, and G. Wang, "Recurrent Attentional Networks for Saliency Detection," in Conference on Computer Vision and Pattern Recognition, CVPR, 2016, pp. 3668-3677.

J. Park, J. Kung, W. Yi, and J. Kim, "Maximizing System Performance by Balancing Computation Loads in LSTM Accelerators," in Proceedings 2018 Design, Automation Test in Europe Conference Exhibition, DATE, 2018, pp. 7-12, EDAA.

J. Pennington, R. Socher, and C. D. Manning, "GloVe: Global Vectors for Word Representation," in Proceedings of the 2014 Conference on Empirical Methods in Natural Language Processing (EMNLP), Oct. 25-29, 2014, pp. 1532-1543, 2014 Association for Computational Linguistics, Doha, Qatar.

J. Qiu, J. Wang, S. Yao, K. Guo, B. Li, E. Zhou, J. Yu, T. Tang, N. Xu, S. Song, Y. Wang, and H. Yang, "Going Deeper with Embedded FPGA Platform for Convolutional Neural Network," in Proceedings of the 2016 ACM/SIGDA International Symposium on Field-Programmable Gate Arrays, FPGA, Feb. 21-23, 2016, pp. 26-35, Monterey, CA, USA.

J. Rae, J. J. Hunt, I. Danihelka, T. Harley, A. W. Senior, G. Wayne, A. Graves, and T. Lillicrap, "Scaling Memory-Augmented Neural Networks withSparse Reads and Writes," in Proceedings of the 30th Conference on Neural Information Processing Systems, NIPS, 2016, pp. 1-9, Barcelona, Spain.

J. Weston et al., "Towards AI-Complete Question Answering:A Set of Prerequisite Toy Tasks," in Proceedings of the 4th International Conference on Learning Representations, ICLR, 2016, pp. 1-14.

(56) References Cited

OTHER PUBLICATIONS

K. Kim, M. Heo, S. Choi, and B. Zhang, "DeepStory: Video Story QA by Deep Embedded Memory Networks," in Proceedings of International Joint Conference on Artificial Intelligence, IJCAI, 2017.
K. M. Hermann, T. Kociský, E. Grefenstette, L. Espeholt, W. Kay, M. Suleyman, and P. Blunsom, "Teaching Machines to Read and Comprehend," in Advances in Neural Information Processing Systems, NIPS, 2015, pp. 1-9.
K. Simonyan and A. Zisserman, "Very deep convolutional networks for large-scale image recognition," Sep. 4, 2014, pp. 1-14, CoRR, 2014, ICLR 2015.
K. Xu, J. Ba, R. Kiras, K. Cho, A. C. Courville, R. Salakhutdinov, R. S. Zemel, and Y. Bengio, "Show, Attend and Tell: Neural Image CaptionGeneration with Visual Attention," in Proceedings of the 32nd International Conference on Machine Learning, 2015, vol. 37, Lille, France.
Luong, Minh-Thang, Hieu Pham, and Christopher D. Manning. "Effective Approaches to Attention-based Neural Machine Translation," CoRR, 2015.
M. Abadi, A. Agarwal, P. Barham, E. Brevdo, Z. Chen, C. Citro, G. Corrado, A. Davis, J. Dean, M. Devin, et al., "TensorFlow: Large-Scale Machine Learning on Heterogeneous Distributed Systems," CoRR, Preliminary White Paper, Nov. 9, 2015, pp. 1-19.
M. J. Seo, A. Kembhavi, A. Farhadi, and H. Hajishirzi, "Bi-Directional Attention Flow for Machine Comprehension," in Proceedings of the 5th International Conference on Learning Representations, ICLR, 2017, pp. 1-13.
M. Jaderberg, K. Simonyan, A. Zisserman, and K. Kavukcuoglu, "Spatial Transformer Networks," in Proceedings of the 28th International Conference on Neural Information Processing Systems, NIPS, 2015, pp. 1-9.
M. Tapaswi, Y. Zhu, R. Stiefelhagen, A. Torralba, R. Urtasun, and S. Fidler, "MovieQA: Understanding Stories in Movies through Question-Answering," in Conference on Computer Vision and Pattern Recognition, CVPR, 2016, pp. 4631-4640, Las Vegas, NV, USA.
Mishra, Nikhil, et al., "A Simple Neural Attentive Meta-Learner," CoRR, 2017, pp. 1-17.
N. P. Jouppi et al., "In-Datacenter Performance Analysis of a Tensor Processing Unit," in Proceedings of the 44th Annual International Symposium on Computer Architecture, ISCA, 2017, pp. 1-12, Jun. 24-28, 2017, Toronto, ON, Canada.
N. Pappas and A. Popescu-Belis, "Multilingual Hierarchical Attention Networks for Document Classification," in Proceedings of the Eighth International Joint Conference on Natural Language Processing, IJCNLP, 2017.
Oh, Junhyuk, et al., "Control of Memory, Active Perception, and Action in Minecraft," CoRR, Proceedings of the 33 rd International Conference on MachineLeaming, 2016, New York, NY, USA.
P. Judd, J. Albericio, T. Hetherington, T. M. Aamodt, and A. Moshovos, "Stripes: Bit-Serial Deep Neural Network Computing," in Proceedings of the 49th Annual IEEE/ACM International Symposium on Microarchitecture, MICRO, 2016.
P. Rajpurkar, J. Zhang, K. Lopyrev, and P. Liang, "SQuAD: 100,000+ Questions for Machine Comprehension of Text," in Empirical Methods in Natural Language Processing, EMNLP, 2016.
P. Ram and A. G. Gray, "Maximum Inner-Product Search Using Cone Trees," in Proceedings of the 18th ACM SIGKDD International Conference on Knowledge Discovery and Data Mining, KDD, Aug. 12-16, 2012, pp. 931-939, Beijing, China.
Parisotto, Emilio, and Ruslan Salakhutdinov, "Neural Map: Structured Memory for Deep Reinforcement Learning," CoRR, 2017, pp. 1-13.
Q. You, H. Jin, Z. Wang, C. Fang, and J. Luo, "Image Captioning with Semantic Attention," in Conference on Computer Vision and Pattern Recognition, CVPR, 2016, pp. 4651-4659.
S. Chandar, S. Ahn, H. Larochelle, P. Vincent, G. Tesauro, and Y. Bengio, "Hierarchical Memory Networks," CoRR, 2016, pp. 1-10.
S. Chopra, M. Auli, and A. M. Rush, "Abstractive Sentence Summarization with Attentive Recurrent Neural Networks," in The 12 Conference of the North American Chapter of the Association for Computational Linguistics, NAACL, Jun. 12-17, 2016, pp. 93-98, San Diego, California.
S. Han, J. Kang, H. Mao, Y. Hu, X. Li, Y. Li, D. Xie, H. Luo, S. Yao, Y. Wang, H. Yang, and W. B. J. Dally, "ESE: Efficient Speech Recognition Engine with Sparse LSTM on FPGA," in Proceedings of the 2017 ACM/SIGDA International Symposium on Field-Programmable Gate Arrays, FPGA, Feb. 22-24, 2017, pp. 75-84, Monterey, CA, USA.
S. Han, X. Liu, H. Mao, J. Pu, A. Pedram, M. A. Horowitz, and W. J. Dally, "EIE: Efficient Inference Engine on Compressed Deep Neural Network," in Proceedings of the 43rd International Symposium on Computer Architecture, ISCA, 2016, pp. 243-254, IEEE Computer Society.
S. Na, S. Lee, J. Kim, and G. Kim, "A Read-Write Memory Network for Movie Story Understanding," in International Conference on Computer Vision, ICCV, 2017, pp. 677-685.
S. Sharma, R. Kiros, and R. Salakhutdinov, "Action Recognition Using Visual Attention," in Proceedings of the 4th International Conference on Learning Representations, Workshop track—ICLR 2016, pp. 1-11.
S. Sukhbaatar, J. Weston, R. Fergus, et al., "End-To-End Memory Networks," in Proceedings of the 28th International Conference on Neural Information Processing Systems, NIPS, 2015, pp. 1-9.
S. Zhang, Z. Du, L. Zhang, H. Lan, S. Liu, L. Li, Q. Guo, T. Chen, and Y. Chen, "Cambricon-X: An Accelerator for Sparse Neural Networks," in Proceedings of 49th Annual IEEE/ACM International Symposium on Microarchitecture, MICRO, 2016.
Santoro, Adam, et al., "Meta-Learning with Memory-Augmented Neural Networks," in Proceedings of the 33 rd International Conference on Machine Learning, ICML, 2016, vol. 48, New York, NY, USA.
T. Chen, Z. Du, N. Sun, J. Wang, C. Wu, Y. Chen, and O. Temam, "DianNao: A Small-Footprint High-Throughput Accelerator for Ubiquitous Machine-Learning," in Proceedings of the 19th International Conference on Architectural Support for Programming Languages and Operating Systems, ASPLOS, Mar. 1-5, 2014, pp. 269-283, Salt Lake City, Utah, USA.
T. Mikolov, I. Sutskever, K. Chen, G. Corrado, and J. Dean, "Distributed Representations of Words and Phrases and their Compositionality," in Proceedings of the 26th International Conference on Neural Information Processing Systems, NIPS, 2013, pp. 1-9.
T. Rocktäschel, E. Grefenstette, K. M. Hermann, T. Kociský, and P. Blunsom, "Reasoning About Entailment with Neural Attention," in Proceedings of the 4th International Conference on Learning Representations, ICLR, 2016, pp. 1-9.
V. Mnih, N. Heess, A. Graves, and K. Kavukcuoglu, "Recurrent Models of Visual Attention," in Proceedings of the 27th International Conference on Neural Information Processing Systems, NIPS, 2014, pp. 1-9.
V. Srinivasan and A. B. Kahng, "Big Chips," IEEE Micro, Jul./Aug. 2011, pp. 3-5, vol. 31, IEEE Computer Society.
V. Sze, Y.-H. Chen, T.-J. Yang, and J. Emer, "Efficient processing of deep neural networks: A tutorial and survey," Dec. 2017, pp. 2295-2329, vol. 105, No. 12, Proceedings of the IEEE, 2017.
Y. Chen, T. Krishna, J. S. Emer, and V. Sze, "Eyeriss: An Energy-Efficient Reconfigurable Accelerator for Deep Convolutional Neural Networks," IEEE Journal of Solid-State Circuits, Jan. 2017, pp. 127-138, vol. 52, No. 1.
Y. Chen, T. Luo, S. Liu, S. Zhang, L. He, J. Wang, L. Li, T. Chen, Z. Xu, N. Sun, and O. Temam, "DaDianNao: A Machine-Learning Supercomputer," in Proceedings of the 47th Annual IEEE/ACM International Symposium on Microarchitecture, MICRO, 2014, pp. 609-622, IEEE Computer Society.
Z. Du, R. Fasthuber, T. Chen, P. Ienne, L. Li, T. Luo, X. Feng, Y. Chen, and O. Temam, "ShiDianNao: Shifting Vision Processing Closer to the Sensor," in Proceedings of the 42nd Annual International Symposium on Computer Architecture, ISCA, Jun. 13-17, 2015, pp. 92-104, Portland, OR, USA.

(56) References Cited

OTHER PUBLICATIONS

Z. Lin et al., "A Structured Self-Attentive Sentence Embedding," in Proceedings of the 5th International Conference on Learning Representations, ICLR, 2017, pp. 1-15.

Z. Yang, D. Yang, C. Dyer, X. He, A. J. Smola, and E. H. Hovy, "Hierarchical Attention Networks for Document Classification," in The Conference of the North American Chapter of the Association for Computational Linguistics, NAACL, Jun. 12-17, 2016, pp. 1480-1489, San Diego, California.

* cited by examiner $$M(\mathrm{n,d}) = \begin{bmatrix} M_{11} & M_{12} & \cdots & M_{1\mathrm{d}} \\ \vdots & & \ddots & \vdots \\ M_{\mathrm{n}1} & M_{\mathrm{n}2} & \cdots & M_{\mathrm{nd}} \end{bmatrix} \qquad V(n,d) = \begin{bmatrix} V_{11} & V_{12} & \cdots & V_{1d} \\ \vdots & & \ddots & \vdots \\ V_{n1} & V_{n2} & \cdots & V_{nd} \end{bmatrix}$$

$$q = (q_1, q_2, \ldots q_{\mathrm{d}})$$

FIG. 1A

<Prior Art>

$$M(\mathrm{n,d}) = \begin{bmatrix} M_{11} & M_{12} & \cdots & M_{1\mathrm{d}} \\ \vdots & & \ddots & \vdots \\ M_{\mathrm{n}1} & M_{\mathrm{n}2} & \cdots & M_{\mathrm{nd}} \end{bmatrix} \qquad V(n,d) = \begin{bmatrix} V_{11} & V_{12} & \cdots & V_{1d} \\ \vdots & & \ddots & \vdots \\ V_{n1} & V_{n2} & \cdots & V_{nd} \end{bmatrix}$$

$$q = (q_1, q_2, \ldots q_{\mathrm{d}})$$

[1] Inner product of each row in memory and q is computed

For each $1 \le i \le \mathrm{n}$, $S_i = M(i,:) \cdot q = \mathrm{M}_{i1}\mathrm{q}_1 + \mathrm{M}_{i2}\mathrm{q}_2 + \ldots + \mathrm{M}_{i\mathrm{d}}\mathrm{q}_\mathrm{d}$

[2] Softmax normalization is performed

For each $1 \le i \le \mathrm{n}$, $W_i = \frac{exp\,(S_i)}{\sum_1^N exp(S_j)}$

[3] Compute the final output $$r = \sum_{1}^{N} W_i\, V(i,:)$$

FIG. 1B

<Prior Art>

| Key Matrix M | | |
|---|---|---|
| -0.6 | 0.1 | 0.8 |
| 0.1 | -0.2 | -0.9 |
| 0.8 | 0.6 | 0.7 |
| 0.5 | 0.7 | 0.5 |

Maximum Pointer

| CID = 0 | | CID = 1 | | CID = 2 | |
|---|---|---|---|---|---|
| RID | VAL | RID | VAL | RID | VAL |

| Sorted Key Matrix M | | |
|---|---|---|
| -0.6 | -0.2 | -0.9 |
| 0.1 | 0.1 | 0.5 |
| 0.5 | 0.6 | 0.7 |
| 0.8 | 0.7 | 0.8 |

Minimum Pointer

| CID = 0 | | CID = 1 | | CID = 2 | |
|---|---|---|---|---|---|
| RID | VAL | RID | VAL | RID | VAL |

FIG. 5

| Key Matrix M | | |
|---|---|---|
| -0.6 | 0.1 | 0.8 |
| 0.1 | -0.2 | -0.9 |
| 0.8 | 0.6 | 0.7 |
| 0.5 | 0.7 | 0.5 |

Maximum Pointer

| CID = 0 | | CID = 1 | | CID = 2 | |
|---|---|---|---|---|---|
| RID | VAL | RID | VAL | RID | VAL |
| 2 | 0.8 | 1 | -0.2 | 0 | 0.8 |

Minimum Pointer

| CID = 0 | | CID = 1 | | CID = 2 | |
|---|---|---|---|---|---|
| RID | VAL | RID | VAL | RID | VAL |
| 0 | -0.6 | 3 | 0.7 | 1 | -0.9 |

Query Vector

| 0.8 | -0.3 | 0.4 |
|---|---|---|

FIG. 6

| Key Matrix M | | |
|---|---|---|
| -0.6 | 0.1 | 0.8 |
| 0.1 | -0.2 | -0.9 |
| 0.8 | 0.6 | 0.7 |
| 0.5 | 0.7 | 0.5 |

Maximum Pointer

| CID = 0 | | CID = 1 | | CID = 2 | |
|---|---|---|---|---|---|
| RID | VAL | RID | VAL | RID | VAL |
| 2 | 0.8 | 1 | -0.2 | 0 | 0.8 |

Minimum Pointer

| CID = 0 | | CID = 1 | | CID = 2 | |
|---|---|---|---|---|---|
| RID | VAL | RID | VAL | RID | VAL |
| 0 | -0.6 | 3 | 0.7 | 1 | -0.9 |

Query Vector

| 0.8 | -0.3 | 0.4 |
|---|---|---|

| Partial Similarity | | |
|---|---|---|
| *-0.48* | -0.03 | ***0.32*** |
| 0.08 | ***0.06*** | *-0.36* |
| ***0.64*** | -0.18 | 0.28 |
| 0.40 | -0.21 | 0.20 |

Output of a First Selector

| 0.64 | 0.06 | 0.32 |
|---|---|---|

Output of a Second Selector

| -0.48 | -0.21 | -0.36 |
|---|---|---|

| Actual Score |
|---|
| -0.19 |
| -0.50 |
| 0.74 |
| 0.39 |

FIG. 7

| Key Matrix M | | |
|---|---|---|
| -0.6 | 0.1 | 0.8 |
| 0.1 | -0.2 | -0.9 |
| 0.8 | 0.6 | 0.7 |
| 0.5 | 0.7 | 0.5 |

Maximum Pointer

| CID = 0 | | CID = 1 | | CID = 2 | |
|---|---|---|---|---|---|
| RID | VAL | RID | VAL | RID | VAL |
| 2 | 0.8 | 1 | -0.2 | 0 | 0.8 |

Minimum Pointer

| CID = 0 | | CID = 1 | | CID = 2 | |
|---|---|---|---|---|---|
| RID | VAL | RID | VAL | RID | VAL |
| 0 | -0.6 | 3 | 0.7 | 1 | -0.9 |

Query Vector

| 0.8 | -0.3 | 0.4 |
|---|---|---|

| Partial Similarity | | |
|---|---|---|
| *-0.48* | -0.03 | ***0.32*** |
| 0.08 | ***0.06*** | *-0.36* |
| ***0.64*** | -0.18 | 0.28 |
| 0.40 | -0.21 | 0.20 |

Output of a First Selector

| ***0.64*** | 0.06 | 0.32 |
|---|---|---|

Output of a Second Selector

| ***-0.48*** | -0.21 | -0.36 |
|---|---|---|

Number of Iteration = 1

| Estimated Score |
|---|
| ***-0.48*** |
| - |
| ***0.64*** |
| - |

FIG. 8

METHOD FOR CANDIDATE SELECTION AND ACCELERATOR FOR PERFORMING CANDIDATE SELECTION

CROSS-REFERENCE TO RELATED APPLICATIONS

The present application claims priority under 35 U.S.C. § 119(a) to Korean Patent Application No. 10-2019-0035790, filed on Mar. 28, 2019 and Korean Patent Application No. 10-2020-0020750, filed on Feb. 20, 2020, which are incorporated herein by reference in its entirety.

BACKGROUND

1. Technical Field

Various embodiments generally relate to a method of candidate selection and an accelerator for performing candidate selection.

2. Related Art

Neural networks are widely used in artificial intelligence technology such as computer vision and natural language processing.

In an operation using the neural network, multiplication and addition operations are performed a very large number of times while performing operations using a weight matrix and an input vector.

For example, in a neural network model called VGG-16, about 15 billion multiplication and addition operations are performed to process an image of a 224×224 size.

Various hardware accelerators in the form of FPGA or ASIC are being developed to efficiently perform these large scale operations.

Such conventional accelerators are optimized for conventional neural networks such as CNN (Convolutional Neural Network) or RNN (Recurrent Neural Network).

Recently, a neural network technique has been developed in which a neural network operation is performed after selecting information having a high degree of similarity with input data to be processed, among a lot of information stored in the past.

Attention mechanism is an example of a technique for selecting information having high amounts of similarities.

The attention mechanism is a content-based similarity selection technique that retrieves data that is highly related to query data among information stored in the past.

FIGS. 1A and 1B are mathematical expressions explaining the operation of the attention mechanism.

The attention mechanism performs an operation in the order shown in FIG. 1B using a key matrix M, a value matrix V, and a query vector q shown in FIG. 1A.

First, inner product calculation is performed for each row of the key matrix M and the query vector q to calculate a score Si for each row.

Next, Softmax normalization is performed on the scores calculated for rows of the key matrix M.

During the Softmax normalization, exponentiations each with a base of natural constant e and an exponent of a score Si corresponding to i-th row of the key matrix M are calculated and weights each is designated as Wi and is expressed as a ratio between an exponentiation corresponding to i-th row of the key matrix M and the sum of exponentiations are calculated.

The final output value r is determined by the product of the weight vector W and the value matrix V.

Even in the process of selecting information having a high similarity, a large number of calculations must be performed using the stored information and the currently input information. Moreover, as the amount of stored information increases, the amount of calculations increases.

SUMMARY

In accordance with the present teachings, an accelerator including a key matrix register configured to store a key matrix, a query vector register configured to store a query vector; and a preprocessor configured to calculate similarities between the query vector and the key matrix.

In accordance with the present teachings, a method for selecting at least one candidate row among rows of a key matrix generated from stored information to be calculated with a query vector includes allocating a plurality of maximum pointers each indicating a maximum element of a corresponding column of the key matrix; selecting maximum partial similarity values among a plurality of partial similarity values each generated by multiplying one of elements indicated by the plurality of maximum pointers by a corresponding element of the query vector; calculating estimated scores by accumulating the maximum partial similarity values in a corresponding row; and selecting the at least one candidate row according to the estimated scores.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

FIGS. 1A and 1B illustrates an attention mechanism according to a conventional art.

FIGS. 5, 6, 7, 8, 9, and 10 show diagrams illustrating operations of a preprocessor according to an embodiment of the present disclosure.

DETAILED DESCRIPTION

The following detailed description references the accompanying figures in describing embodiments consistent with this disclosure. The examples of the embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure.

Rather, the scope of the present disclosure is defined only in accordance with the presented claims and equivalents thereof.

Figure 2:
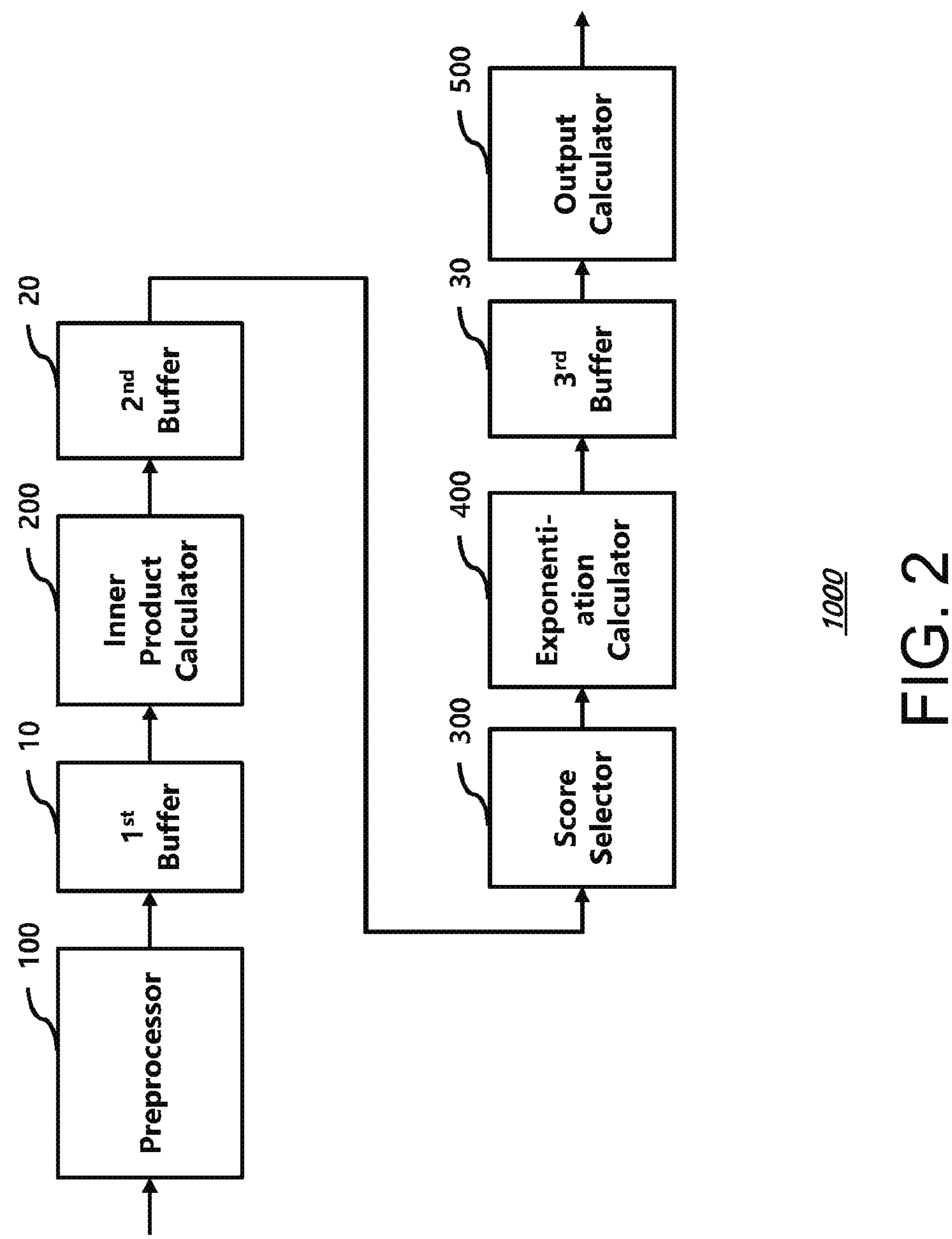
FIG. 2 shows a block diagram illustrating an accelerator according to an embodiment of the present disclosure.

FIG. 2 shows a block diagram illustrating an accelerator 1000 according to an embodiment of the present disclosure.

The accelerator 1000 includes a preprocessor 100, an inner product calculator 200, a score selector 300, an exponentiation calculator 400, and an output calculator 500.

The accelerator 1000 may further include a first buffer 10 for buffering an output of the preprocessor 100, a second buffer 20 for buffering an output of the inner product calculator 200, a third buffer 30 for buffering an output of the exponentiation calculator 400.

In FIG. 1, after performing Softmax normalization, a weight Wi approximately equal to 0 has little influence on the subsequent calculation result. For example, a weight Wi whose magnitude is less than 0.01 may have little influence on the subsequent calculation result.

Since a magnitude of the weight Wi is related to a score Si, the weight Wi becomes lesser when the score Si is lesser.

Also, if the weight Wi is approximately zero, the effect of the weight on the accuracy of a final calculation result is less. Accordingly, when the weight Wi is lesser, it is effective to reduce amount of calculations by treating the weight Wi as zero.

In order to further reduce the amount of calculations, it is possible to omit calculations with rows that are expected to generate small scores in the process of performing calculations with the key matrix.

To this end, the present disclosure performs a preprocessing for selecting rows in the key matrix that are expected to generate large scores.

The preprocessor 100 performs a preprocessing operation for the key matrix M.

Figure 3:
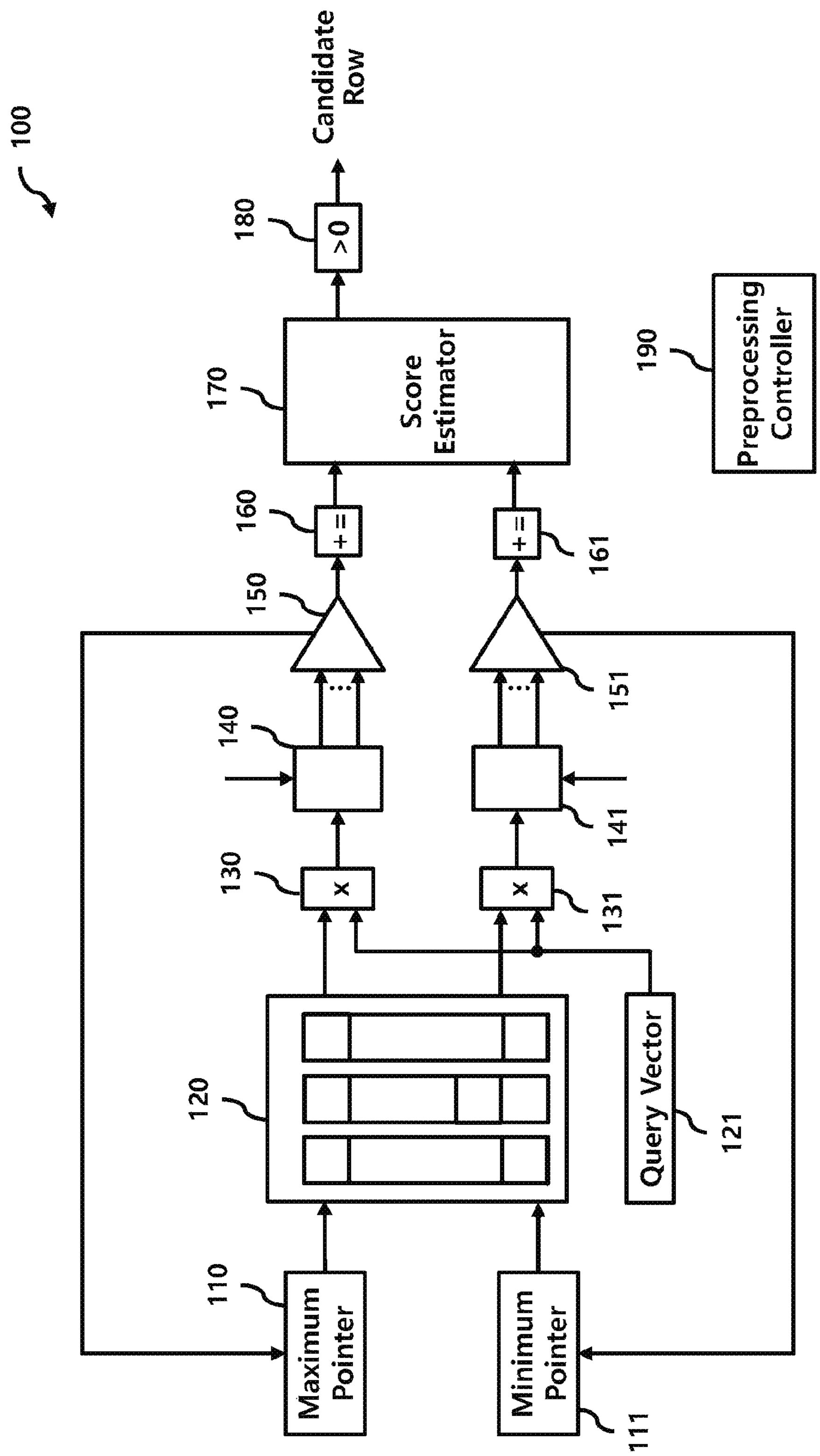
FIG. 3 shows a block diagram illustrating a preprocessor according to an embodiment of the present disclosure.

FIG. 3 is a block diagram of the preprocessor 100 according to an embodiment of the present disclosure.

Hereinafter, operation of the preprocessor 100 will be described with reference to the flowcharts of FIGS. 4A and 4B and diagrams of FIGS. 5 to 10.

The preprocessor 100 includes a maximum pointer register 110, a minimum pointer register 111, a key matrix register 120, a query vector register 121, a first multiplier 130, a second multiplier 131, a first selector 140, a second selector 141, a maximum selector 150, a minimum selector 151, a first accumulator 160, a second accumulator 161, a score estimator 170, and a candidate selector 180.

The key matrix register 120 stores a key matrix.

Figure 4A:
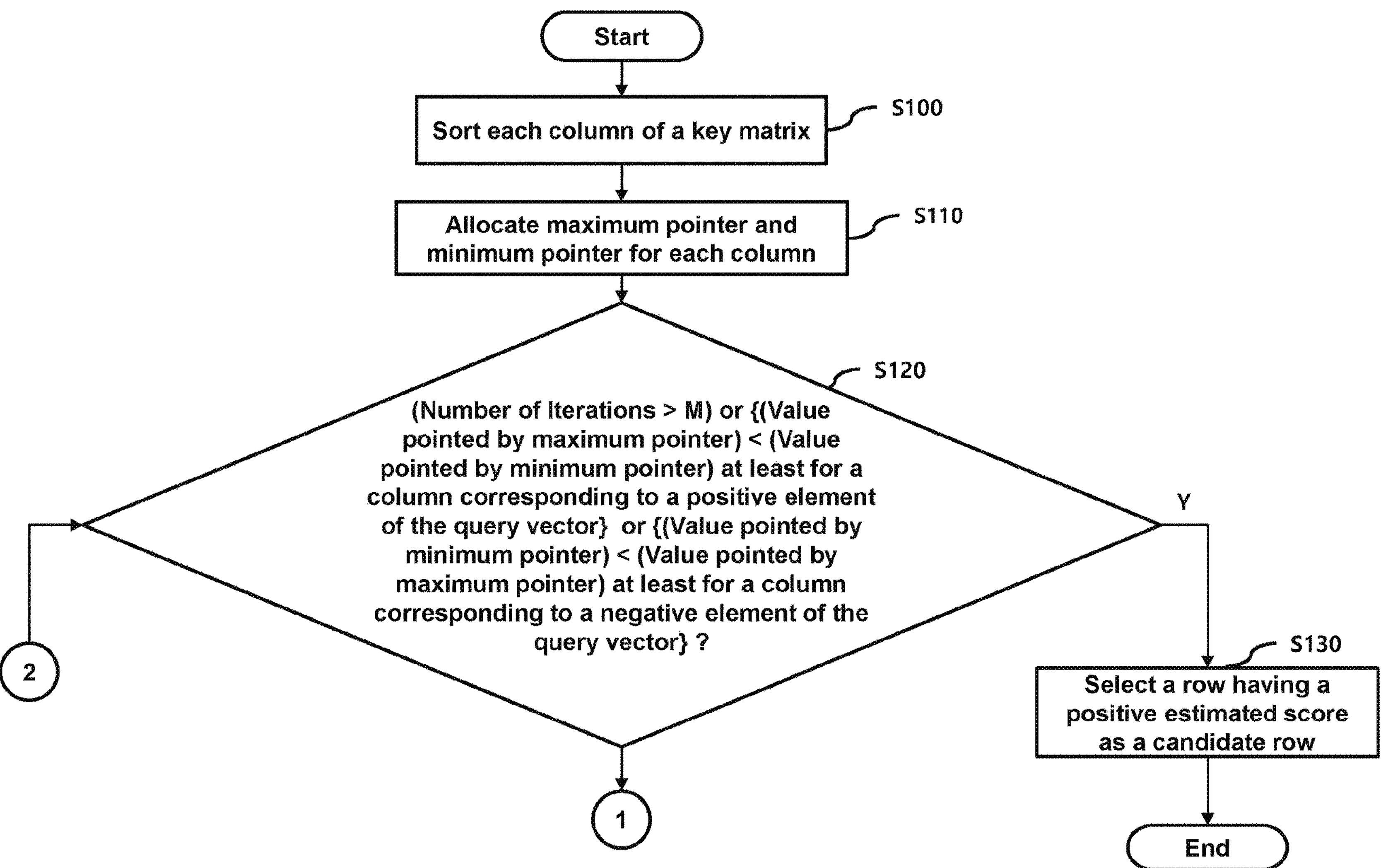
FIGS. 4A and 4B show flowcharts illustrating an operation of a preprocessor according to an embodiment of the present disclosure.

The operation at the key matrix register 120 corresponds to steps S100 and S110 in the flowchart of FIG. 4A. Columns of the key matrix may be sorted before they are stored in the key matrix register 120. At this time the step S100 may not be performed by the key matrix register 120.

FIG. 5 illustrates an operation with the key matrix register 120.

When the key matrix register 120 stores each column therein, a pointer indicating a maximum value and a pointer indicating a minimum value in each column are stored.

Accordingly, the maximum pointer register 110 stores a pointer indicating a maximum value in each column, and the minimum pointer register 111 stores a pointer for indicating a minimum value in each column.

At this time, the row number RID can be stored as a pointer value.

For example, for the first column (i.e. column identification (CID)=0), a corresponding row number RID having a maximum value VAL may be stored as a maximum pointer in the maximum pointer register 110. Similarly, for the first column (i.e. CID=0), a corresponding row number RID having a minimum value VAL may be stored as a minimum pointer in the minimum pointer register 111. When determining a maximum value pointer and a minimum value pointer for each column, the key matrix and the query vector may be considered together. Detailed descriptions thereof are disclosed below.

The key matrix register 120 may sort each column of the key matrix to find a maximum pointer and a minimum pointer.

At this time, the key matrix register 120 may store the key matrix after sorting each column in order of magnitude.

When the key matrix is sorted and stored, the sorting operation may not be repeated to update the maximum pointer and the minimum pointer as described below.

When the key matrix is stored by sorting each column, the relationship between row numbers before and after sorting the key matrix may be stored.

Hereinafter, for convenience of explanation, the operation will be described with reference to the row number of the key matrix before sorting. An operation performed based on the row number after sorting will be understood by referring to this disclosure.

Because the key matrix is generated from the data stored in the past, it may be prepared before a query vector is input.

In this embodiment, the operation of sorting the key matrix may take a relatively long time compared to other operations, but the sorting operation can be performed in advance and it does not affect response time for a query.

Also, when a large number of queries are input, sorted key matrix can be reused multiple times so that the amount of increased operations due to the sorting operation is relatively less.

The query vector register 121 stores the query vector q.

FIG. 6 shows each element of the query vector in the order of the corresponding column of the key matrix.

In FIG. 6, for example, the query vector q is represented as (0.8, −0.3, 0.4).

In this embodiment, the maximum value pointer and the minimum value pointer are determined by considering the key matrix and the query vector.

First, if an element of the query vector is a positive value, the maximum value in the corresponding column of the key matrix is referenced by the maximum value pointer, and if an element in the query vector is a negative value, the minimum value in the corresponding column of the key matrix is referenced by the maximum value pointer.

Next, if an element of the query vector is a positive value, the minimum value in the corresponding column of the key matrix is referenced by the minimum value pointer, and if an element of the query vector is a negative value, the maximum value in the corresponding column of the key matrix is referenced by the minimum value pointer.

For example, in FIG. 6, the first element of the query vector is 0.8, which is positive, so that the maximum value 0.8 in the first column (i.e. CID=0) of the key matrix is referenced by the maximum value pointer (i.e. RID=2), and the minimum value −0.6 is referenced by the minimum value pointer (i.e. RID=0).

In addition, in FIG. 6, since the first element of the query vector is negative, the minimum value −0.2 in the first column of the key matrix is referred by the maximum value pointer (i.e. RID=1), and the maximum value 0.7 is referred by the minimum value pointer (i.e. RID=3).

The first multiplier 130 performs a multiplication operation on an element of the query vector and an element of the sorted key matrix.

The first selector 140 selects and outputs a plurality of values each obtained by multiplying an element specified by a maximum pointer (i.e., maximum element) by a corresponding element of the query vector for each column.

Figure 11:
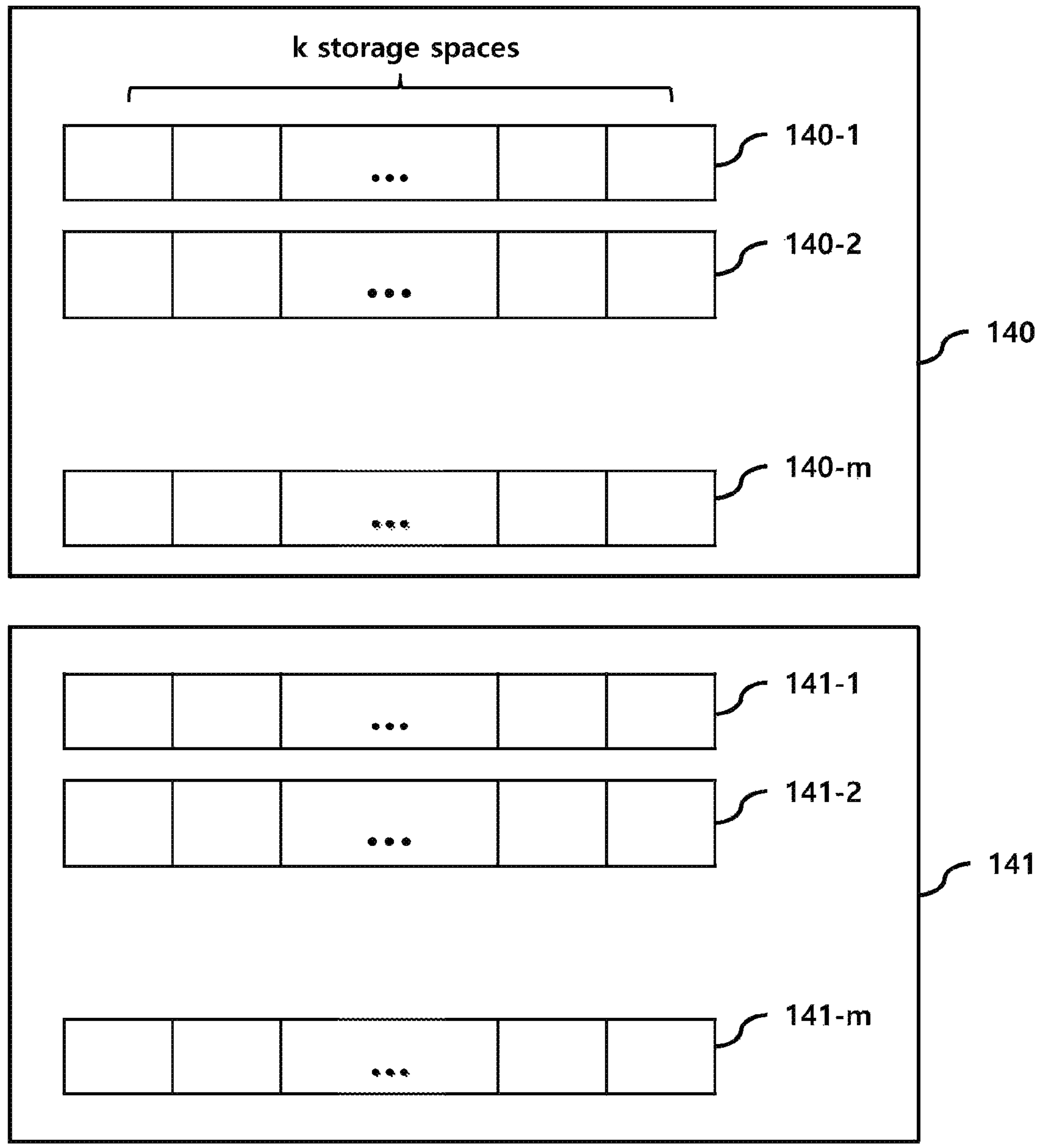
FIG. 11 shows a block diagram illustrating a first selector and a second selector according to an embodiment of the present disclosure.

In an embodiments shown in FIG. 11, the first selector 140 includes a plurality of FIFO registers 140-1, 140-2, . . . , **140-*m***, wherein m corresponds to a number of columns of the key matrix.

When each of the plurality of FIFO registers includes k storage spaces, k partial similarities may be generated by multiplying each of k elements in a corresponding column of the key matrix by a corresponding element of the query vector and the k partial similarities may be stored in the k storage spaces in advance.

At this time the first selector 140 may store the k partial similarities in descending order of magnitude per each column.

By generating the partial similarities and storing the partial similarities in the FIFO registers in advance, computation time may be saved.

The maximum selector 150 selects and outputs a maximum value among the plurality of values output from the first selector 140 and updates the value stored in the maximum pointer register 110.

The second multiplier 131 performs a multiplication operation on an element of the query vector and an element of the sorted key matrix.

The second selector 141 selects and outputs a plurality of values each obtained by multiplying a value specified by a minimum pointer (i.e., minimum element) by a corresponding element of the query vector for each column.

In an embodiments shown in FIG. 11, the second selector 141 includes a plurality of FIFO registers 141-1, 141-2, . . . , **141-*m***, wherein m corresponds to a number of columns of the key matrix.

The second selector 141 may store the k partial similarities in ascending order of magnitude per each column.

By generating the partial similarities and storing the partial similarities in the FIFO registers in advance, computation time may be saved.

The minimum selector 151 selects and outputs a minimum value among the plurality of values output from the second selector 141 and updates the value stored in the minimum pointer register 111.

Although the first multiplier 130 and the second multiplier 131 are separately disposed in this embodiment, the second multiplier 131 may be integrated with the first multiplier 130 to form a single multiplier.

FIG. 7 illustrates operations of the first multiplier 130, the second multiplier 131, the first selector 140, and the second selector 141.

In FIG. 7, a partial similarity represents a value generated by multiplying an element of the key matrix by a corresponding element of the query vector.

In FIG. 7, the actual score corresponds to a score Si derived when a key matrix and a query vector are multiplied according to a conventional attention mechanism.

In a table representing partial similarity in FIG. 7, the results obtained by summing elements by the rows corresponds to the actual scores, which correspond to inner products between rows of the key matrix and the query vector The first selector 140 selects and outputs a plurality of partial similarities each corresponding to a multiplication of an element indicated by a maximum pointer by a corresponding element of the query vector for each column.

Accordingly, the first selector 140 selects the partial similarity 0.64 corresponding to the third row (i.e. RID=2) among the partial similarities corresponding to the first column (i.e. CID=0), selects the partial similarity 0.06 corresponding to the second row (i.e. RID=1) among the partial similarities for the second column (i.e. CID=1), and selects the partial similarity 0.32 corresponding to the first row (i.e. RID=0) among the partial similarities for the third column (i.e. CID=2).

The second selector 141 selects and outputs a plurality of partial similarities each corresponding to a multiplication of an element indicated by a minimum pointer by a corresponding element of the query vector for each column.

Accordingly, the second selector 141 selects the partial similarity −0.48 corresponding to the first row of the partial similarities corresponding to the first column, selects the partial similarity −0.21 corresponding to the fourth row (i.e. RID=3) among the partial similarities for the second column, and selects the partial similarity −0.36 corresponding to the second row among the partial similarities for the third column.

Figure 4B:
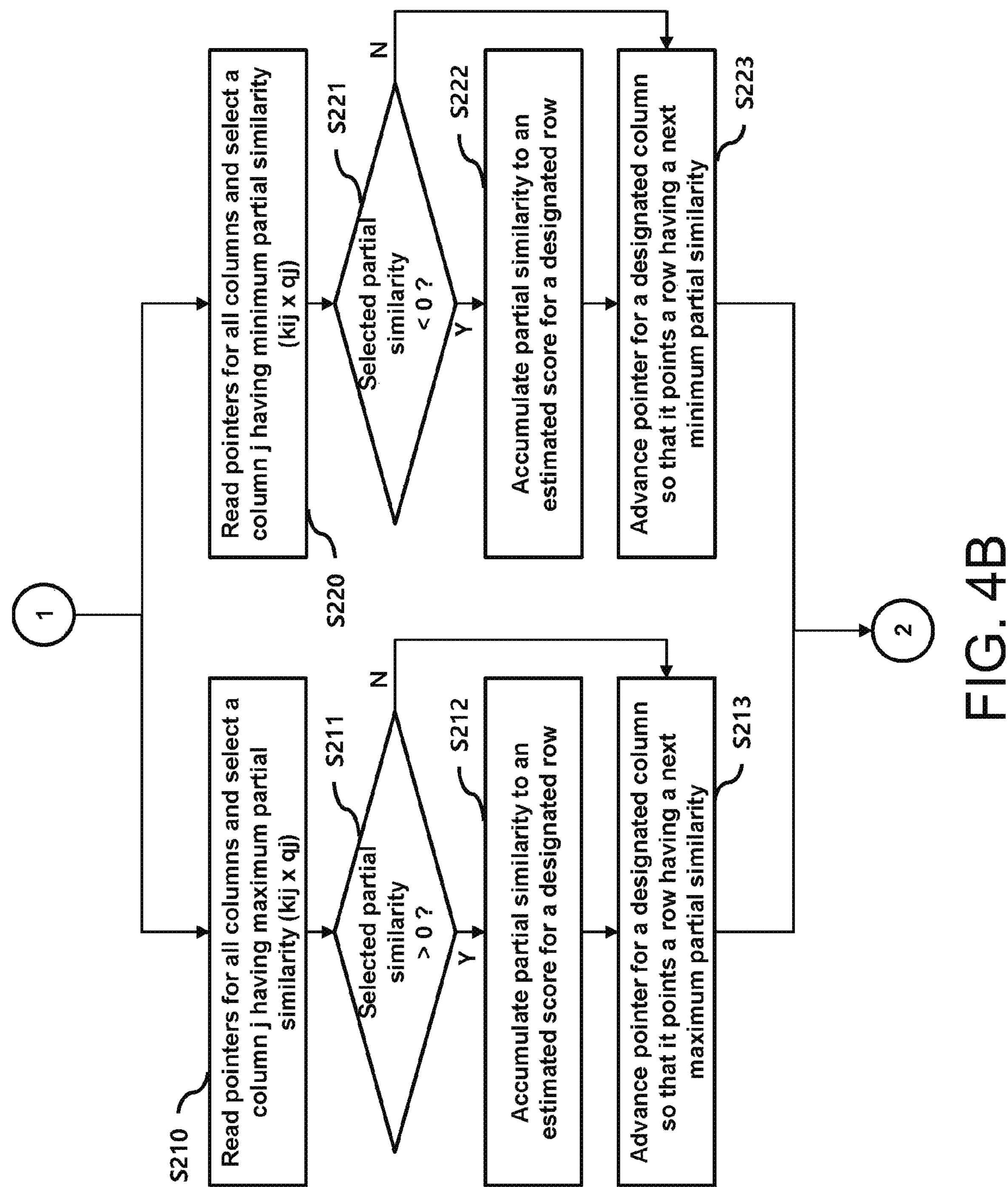

The above operation corresponds to steps S210 and S220 in the flowchart of FIG. 4B.

The maximum selector 150 selects the maximum partial similarity or maximum partial similarity value 0.64 among the plurality of partial similarities or plurality of partial similarity values output from the first selector 140.

If the maximum partial similarity selected by the maximum selector 150 is not a positive value, the maximum partial similarity is regarded as 0.

The maximum partial similarity selected by the maximum selector 150 is accumulated in the first accumulator 160.

The minimum selector 151 selects the minimum partial similarity or minimum partial similarity value −0.48 among the plurality of partial similarities or plurality of partial similarity values output from the second selector 141.

When the minimum partial similarity selected by the minimum selector 151 is not a negative value, the minimum partial similarity is regarded as 0.

The maximum partial similarity selected by the maximum selector 150 is accumulated in the first accumulator 160 and the minimum partial similarity selected by the minimum selector 151 is accumulated in the second accumulator 161.

The score estimator 170 uses values output from the first accumulator 160 and the second accumulator 161 to set the estimated scores for the corresponding rows.

In FIG. 3, the first accumulator 160, the second accumulator 161, and the score estimator 170 are separately disposed. However, the first accumulator 160 and the second accumulator 161 may be included in the score estimator 170.

FIG. 8 shows 0.64, which is the output of the maximum selector 150, and −0.48, which is the output of the minimum selector 151, are accumulated as estimated scores for the corresponding rows.

Since 0.64 corresponds to the third row (i.e. RID=2) of the maximum pointer, it is accumulated as the expected score for the third row. And since −0.48 corresponds to the first row (i.e. RID=0), it is accumulated as the estimated score for the first row.

The maximum selector 150 updates the maximum pointer register 110.

For this purpose, maximum value is selected among elements excluding an element which has been selected as a maximum value for a column where maximum partial similarity has been selected most recently.

Figure 9:
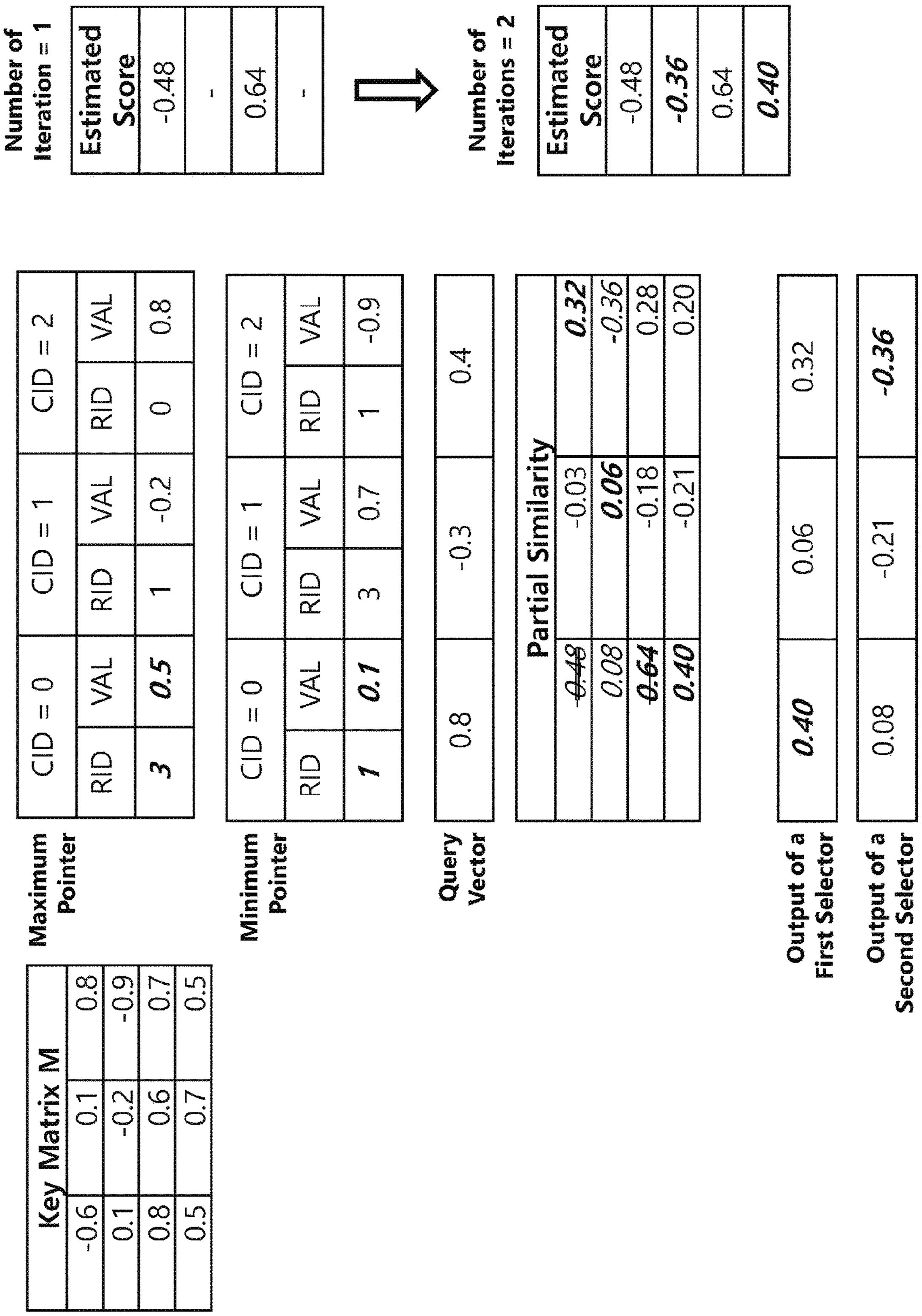

As shown in FIG. 9, the value of the maximum pointer register 110 is updated to indicate the fourth row (i.e.

RID=3) corresponding to the next maximum value of 0.5 with respect to the first column in which the maximum partial similarity has been selected most recently.

The minimum selector 151 updates the minimum pointer register 111.

For this purpose, minimum value is selected among elements excluding elements each has been selected as a minimum value for a column where minimum partial similarity has been selected most recently.

As shown in FIG. 9, the value of the minimum pointer register 110 is updated to indicate the second row (i.e. RID=1) corresponding to the next minimum value of 0.1 for the first column in which the minimum partial similarity has been selected most recently.

The above operations correspond to steps S211 to S213 and steps S221 to S223 in the flowchart of FIG. 4B.

In FIG. 4A, step S120 determines whether the number of iterations is greater than M, and if the number of iterations is less than or equal to M, the above-described operations are repeated. Otherwise, the loop operation is terminated. At this time, M may be set to an arbitrary value.

Moreover, in step S120 of FIG. 4A, it is further determined whether a column exists where a value indicated by the maximum pointer is lesser than a value indicated by the minimum pointer for columns of the key matrix corresponding to positive elements of the query vector. If there is no column satisfying the condition, the loop operation is continued.

Moreover, in step S120 of FIG. 4A, it is further determined whether a column exists where a value indicated by the minimum pointer is lesser than a value indicated by the maximum pointer for columns of the key matrix corresponding to negative elements of the query vector. If there is no column satisfying the condition, the loop operation is continued.

In the present embodiment, the loop operation continues because there is no column where a value indicated by the maximum pointer is less than a value indicated by the minimum pointer.

The step S120 of FIG. 4A may be performed by the preprocessing controller 190 of FIG. 3. The preprocessing controller 190 may control overall operation of the preprocessor 100 by referring to the determination result at the step S120.

FIG. 8 shows estimated scores when the number of iterations is 1, and FIG. 9 shows estimated scores when the number of iterations is 2.

Since the maximum pointer and the minimum pointer are updated as described above, the outputs of the first selector 140 and the second selector 141 are updated thereafter as shown in FIG. 9.

The maximum selector 150 selects 0.40, the first accumulator 160 accumulates the selected value in the corresponding third row, and the score estimator 170 stores the accumulated value as the estimated score for the third row.

The minimum selector 151 selects −0.36, the second accumulator 161 accumulates the selected value in the corresponding first row, and the score estimator 170 stores the accumulated value as the estimated score for the first row.

Figure 10:
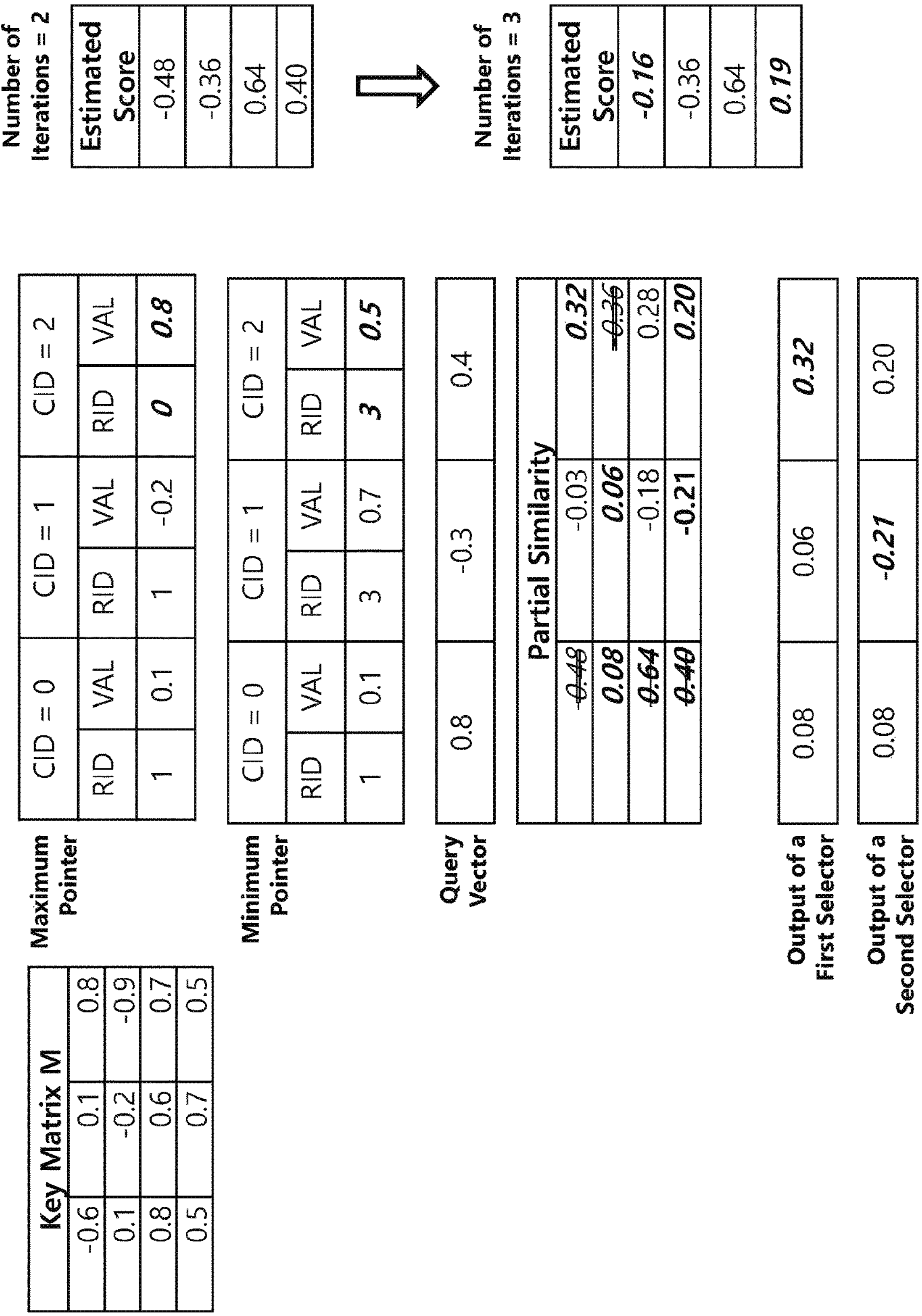

As shown in FIG. 10, the maximum selector 150 updates the maximum pointer register 110 with the first row corresponding to a row having the next maximum value of 0.1 with respect to the first column in which the maximum partial similarity has been selected most recently.

And the minimum selector 151 updates the minimum pointer register 111 with the third row corresponding to a row having the next minimum value of 0.5 with respect to the third column in which minimum partial similarity has been selected most recently.

When the maximum pointer and the minimum pointer are updated as described above, the outputs of the first selector 140 and the second selector 141 are updated thereafter as shown in FIG. 10.

FIG. 9 shows estimated scores when number of iterations is 2, and FIG. 10 shows estimated scores when number of iterations is 3.

The maximum selector 150 selects 0.32 and the first accumulator 160 accumulates the selected value to a corresponding row, which is the first row (i.e. RID=0) and the score estimator 170 stores the accumulated value −0.16 as the estimated score for the first row.

In addition, the minimum selector 151 selects −0.21 and the second accumulator 161 accumulates −0.21 to a corresponding row, which is the fourth row (i.e. RID=3) and the score estimator 170 stores the accumulated value 0.19 as the estimated score for the fourth row.

When the maximum partial similarity or the minimum partial similarity is regarded as 0, the accumulation operation of steps S212 or S222 of FIG. 4B may be omitted.

The above-described operations can be repeated depending on the conditions determined at step S120.

As number of iterations increases, the estimated scores approximates the actual scores but calculation time may also increase.

Therefore, by adjusting maximum number of iterations M, the relationship between calculation time and accuracy can be adjusted.

The candidate selector 180 selects rows each corresponding to positive estimated score as candidates.

For example, in FIG. 10, the third row (i.e. RID=2) and the fourth row (i.e. RID=3) corresponding to positive estimated scores 0.64 and 0.19 are selected as candidates.

The above-described operation corresponds to step S130 in FIG. 4A.

The operation of the preprocessor 100 has been described above.

When the candidate rows are selected in the preprocessor 100, the first buffer 10 stores 0s for all elements in the key matrix except the candidate rows.

In another embodiment, the first buffer 10 may save only row numbers of candidate rows and elements of candidate rows to save storage space.

The inner product calculator 200 performs an inner product operation as disclosed in FIG. 1B to calculate a score vector Si.

In the present embodiment, operations for a row that is not selected as a candidate may be omitted because corresponding elements are all zero.

The score Si calculated by performing an inner product operation between a row of the key matrix and the query vector is stored in the second buffer 20. The maximum value Smax among the calculated scores can be separately stored in the second buffer 20.

The score selector 300 may select some elements of the score vectors Si before proceeding to the operation [2] of FIG. 1B to further reduce the amount of calculations required for Softmax normalization.

The score selector 300 may be further included to further reduce the amount of calculations.

In this embodiment, the score Si having a difference from the maximum score Smax that is less than a threshold value t is set to zero.

In the present embodiment, t is 2.3, which corresponds to a natural logarithm of 10. In other embodiments t is not limited to 2.3.

The exponentiation calculator 400 performs exponentiation calculations with the score vector S.

This is an operation to determine exponentiation value $e^{Si}$ for each score Si, which is required for the [2] Softmax normalization of FIG. 1B.

The output calculator 500 performs Softmax normalization from exponentiation values to generate a weight vector W. The output calculator 500 multiplies the weight vector W by a value matrix V to output a result vector r.

Each element Wi of the weight vector W is as shown in [2] of FIG. 1B and the product of the weight vector W and the value matrix V for deriving the result vector r is disclosed in [3] of FIG. 1B.

Figure 12:
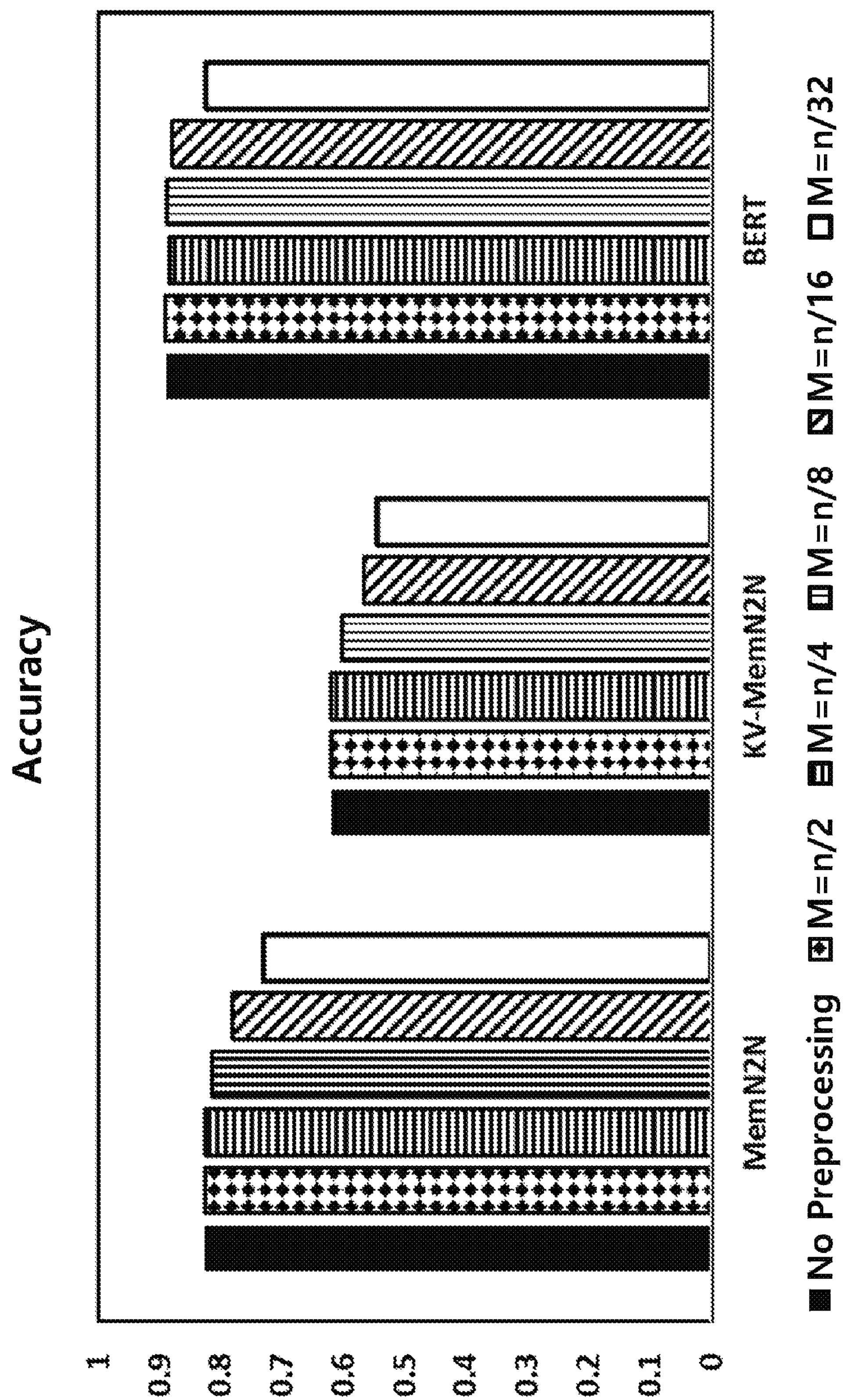
FIGS. 12 and 13 show graphs illustrating effects of the present disclosure.
Figure 13:
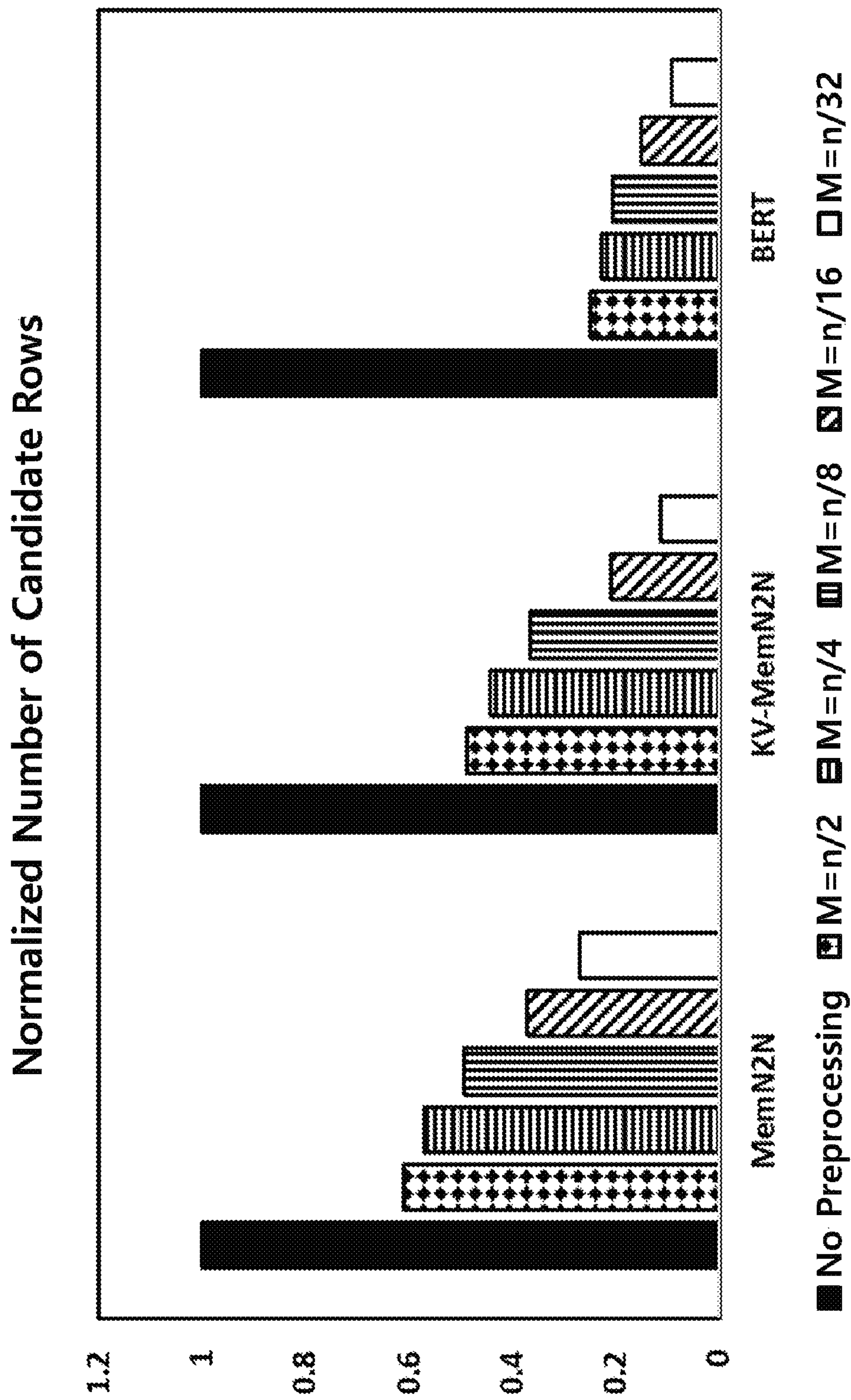

FIGS. 12 and 13 are graphs illustrating effects of the present disclosure.

In each graph, End-to-End Memory Network (MemN2N), Key-value End-to-End Network (KV-MemN2N) and BERT in the horizontal axis represent kinds of neural network operations to which the attention mechanism may be applied, and n represents the number of rows of the key matrix.

FIG. 12 shows a change in accuracy according to the maximum number of iterations M. In FIG. 12, accuracy is represented as a value between 0 and 1 in the y-axis where 1 represents 100% of accuracy.

As shown, the accuracy increases as the maximum number of iterations increases.

FIG. 13 shows normalized number of candidate rows according to the maximum number of iterations M.

As aforementioned, amount of calculations increases as the number of candidate rows increases.

In, FIGS. 12 and 13, when comparing the prior art in which the preprocessing is not performed in the MemN2N neural network with the present embodiment in which M=n/2, the amount of calculations is reduced to ⅓ while the accuracy remains nearly similar to the accuracy when preprocessing is not performed.

Thus, the present embodiment can greatly reduce amount of calculations without significantly reducing the accuracy.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. An accelerator comprising:
- a preprocessor configured to calculate similarities between a query vector and a key matrix and select at least one candidate row among rows of the key matrix to be multiplied with the query vector,
- wherein the preprocessor calculates estimated scores for rows of the key matrix by selecting a maximum partial similarity value and selects the at least one candidate row according to the estimated scores, and
- wherein the maximum partial similarity value is selected from a plurality of partial similarity values each generated by multiplying a maximum element corresponding to a column of the key matrix by a corresponding element of the query vector.

2. The accelerator of claim 1, wherein the preprocessor calculates the estimated scores for rows of the key matrix by selecting a minimum partial similarity value,
- wherein the minimum partial similarity value is selected from a plurality of partial similarity values each generated by multiplying a minimum element corresponding to a column of the key matrix by a corresponding element of the query vector.

3. The accelerator of claim 2, wherein the preprocessor selects a row corresponding to a positive estimated score as a candidate row.

4. The accelerator of claim 2, wherein the preprocessor updates a maximum pointer for a column corresponding to the maximum partial similarity value among columns of the key matrix, updates a minimum pointer for a column corresponding to the minimum partial similarity value among columns of the key matrix, calculates an updated maximum partial similarity value according to an updated maximum pointer, calculates an updated minimum partial similarity value according to an updated minimum pointer and accumulates the updated maximum partial similarity value and the updated minimum partial similarity value to the estimated scores.

5. The accelerator of claim 2, wherein the preprocessor sets the maximum partial similarity value as zero when the maximum partial similarity value is a negative value and sets the minimum partial similarity value as zero when the minimum partial similarity value is a positive value.

6. The accelerator of claim 2, wherein the preprocessor comprises:
- a key matrix register configured for storing the key matrix;
- a query vector register configured to store the query vector;
- a maximum pointer register configured for storing a plurality of maximum pointers each indicating a maximum element of a corresponding column of the key matrix;
- a minimum pointer register configured for storing a plurality of minimum pointers each indicating a minimum element of a corresponding column of the key matrix;
- a first selector configured to output a plurality of partial similarity values each generated by multiplying one of elements indicated by a maximum pointer corresponding to a column of the key matrix by a corresponding element of the query vector;
- a maximum selector configured to select a maximum partial similarity value among outputs of the first selector;
- a second selector configured output a plurality of partial similarity values each generated by multiplying one of elements indicated by a minimum pointer corresponding to a column of the key matrix by a corresponding element of the query vector;
- a minimum selector configured to select a minimum partial similarity value among outputs of the second selector;
- a score estimator configured to calculate estimated scores by accumulating the maximum partial similarity values and the minimum partial similarity values in corresponding rows; and
- a candidate selector configured to select at least one candidate row according to the estimated scores.

7. The accelerator of claim 6, wherein the maximum pointer register updates a maximum pointer in a column corresponding to a most recently selected maximum partial similarity value and the minimum pointer register updates a minimum pointer in a column corresponding to most recently selected minimum partial similarity value.

8. The accelerator of claim 7, the first selector updates and outputs a plurality of partial similarity values when the maximum pointer register updates the maximum pointer and the second selector updates and outputs a plurality of partial similarity values when the minimum pointer register updates the minimum pointer.

9. The accelerator of claim 8, the maximum selector outputs an updated maximum partial similarity value when the first selector updates and outputs a plurality of partial similarity values, the minimum selector outputs an updated minimum partial similarity value when the second selector updates and outputs a plurality of partial similarity values, and the score estimator updates the estimated scores by accumulating the updated maximum partial similarity value in a corresponding row and by accumulating the updated minimum partial similarity value in a corresponding row.

10. The accelerator of claim 9, further comprising:

a preprocessing controller configured to determine the estimated scores when a number of iterations for updating the estimated scores is greater than a threshold value.

11. The accelerator of claim 10, wherein the preprocessinq controller finalizes the estimated scores when there exists a column where a value indicated by a maximum pointer is less than a value indicated by a minimum pointer among columns corresponding to positive elements of the query vector or when there exists a column where a value indicated by a minimum pointer is less than a value indicated by a maximum pointer among columns corresponding to negative elements of the query vector.

12. The accelerator of claim 6, wherein the first selector or the second selector includes a plurality of FIFO registers corresponding to a number of columns of the key matrix, wherein each of the FIFO registers includes a plurality of storage spaces.

13. The accelerator of claim 1, further comprising:

an inner product calculator configured to calculate inner product operations between at least one candidate row selected by the preprocessor and the query vector and to output a score vector;

an exponentiation calculator configured to calculate exponentiation with each element of the score vector as an exponent; and an output calculator configured to perform a normalization operation using output of the exponentiation calculator and to generate a weight vector.

14. The accelerator of claim 13, further comprising:

a score selector configured to set an element of the score vector as zero when a difference between the element of the score vector and maximum element of the score vector is less than or equal to a threshold value.

15. A method for selecting at least one candidate row among rows of a key matrix generated from stored information to be calculated with a query vector, the method comprising:

allocating a plurality of maximum pointers each indicating a maximum element of a corresponding column of the key matrix;

selecting maximum partial similarity values among a plurality of partial similarity values each generated by multiplying one of elements indicated by the plurality of maximum pointers by a corresponding element of the query vector;

calculating estimated scores by accumulating the maximum partial similarity values in a corresponding row; and selecting the at least one candidate row according to the estimated scores.

16. The method of claim 15, further comprising:

allocating a plurality of minimum pointers each indicating a minimum element of a corresponding column of the key matrix;

selecting a minimum partial similarity value among a plurality of partial similarity values each generated by multiplying one of elements indicated by the plurality of minimum pointers by a corresponding element of the query vector; and calculating the estimated scores by accumulating the minimum partial similarity values in a corresponding row.

17. The method of claim 16, further comprising sorting elements in each column of the key matrix in order of magnitude.

18. The method of claim 16, further comprising:

updating the maximum pointer of a column corresponding to the maximum partial similarity value after the maximum partial similarity value is selected and updating the minimum pointer of a column corresponding to the minimum partial similarity value after the minimum partial similarity value is selected;

selecting an updated maximum partial similarity value among a plurality of partial similarity values each generated by multiplying one of elements indicated by the plurality of maximum pointers including an updated maximum pointer by a corresponding element of the query vector;

selecting an updated minimum partial similarity value among a plurality of partial similarity values each generated by multiplying one of elements indicated by the plurality of minimum pointers including an updated minimum pointer by a corresponding element of the query vector; and updating the estimated scores by accumulating the updated maximum partial similarity values in a corresponding row and by accumulating the updated minimum partial similarity values in a corresponding row.

19. The method of claim 17, further comprising:

finalizing the estimated scores when a number of iterations for updating the estimated scores is greater than a threshold value, when there exists a column where a value indicated by the updated maximum pointer is less than a value indicated by the updated minimum pointer among columns corresponding to positive elements of the query vector, or when there exists a column where a value indicated by the updated minimum pointer is less than a value indicated by the updated maximum pointer among columns corresponding to negative elements of the query vector.

20. The method of claim 15, further comprising:

setting the maximum partial similarity value as zero when the maximum partial similarity value is a negative value and setting the minimum partial similarity value as zero when the minimum partial similarity value is positive value.

* * * * *